United States Patent [19]
Lundahl et al.

[11] Patent Number: 5,305,586
[45] Date of Patent: Apr. 26, 1994

[54] CROP PROCESSOR

[75] Inventors: E. Cordell Lundahl, Providence; Laurel H. Jensen, Hyrum, both of Utah

[73] Assignee: Lundahl Research, Inc., Logan, Utah

[21] Appl. No.: 932,601

[22] Filed: Aug. 20, 1992

[51] Int. Cl.$^5$ .............................................. A01D 34/53
[52] U.S. Cl. ...................................... 56/14.4; 56/14.5; 56/17.2; 56/156
[58] Field of Search ............... 56/156, 192, 17.2, 14.4, 56/14.5; 241/260.1

[56] References Cited

U.S. PATENT DOCUMENTS

| | | | |
|---|---|---|---|
| 2,641,888 | 6/1953 | Grether | 56/14.5 |
| 4,473,993 | 10/1984 | Jennings et al. | 56/208 |
| 4,722,174 | 2/1988 | Landry et al. | 56/14.5 |
| 5,005,342 | 4/1991 | Lundahl et al. | 56/10.2 |

FOREIGN PATENT DOCUMENTS 672019  10/1963  Canada .................................. 56/14.5

Primary Examiner—Mark Rosenbaum
Assistant Examiner—John M. Husar
Attorney, Agent, or Firm—Rockey, Rifkin & Ryther

[57] ABSTRACT

An auger cutter, windrower and conditioner for standing and downed crops such as hay, or forage harvester crops such as corn, sorghum and cereals including a cutter auger with cutting teeth attached to an auger flight and a conveyor auger to move the cut crop to a central area or to either side of the cutter to be discharged as a windrow or as a mass of material, or to be fed to a second crop processing device such as a forage harvester. An improved relationship of the cutting augers and the conveyor augers and height control mechanism to improve the cutting and transport of the crop.

10 Claims, 3 Drawing Sheets

CROP PROCESSOR

BACKGROUND OF THE INVENTION

This invention relates to apparatus for processing crops and particularly for cutting, conditioning, and windrowing standing and downed crops such as hay and grasses and for cutting standing crops such as corn, sorghum and cereal. Compressing and feeding such latter crops to a second crop processing device such as a forage harvester may also be accomplished.

The desirability of auger cutters to cut standing and downed crops has previously been recognized. Such cutters are efficient and generally less susceptible to jamming or plugging and damage than the well-known sickle bar or rotary blade types of cutters. Prior art crop processors include many devices showing auger type cutters of various configurations for various purposes. A prior art cutter or processor developed especially for use with hay is shown and described in U.S. Pat. No. 4,550,554. Prior art cutters for hay had cutting and handling disadvantages and also could not adequately cut and handle large crops such as corn. The cutting mechanism of this invention has been improved in both cutting and handling over the prior art. The crop transfer mechanisms included in this processor are also advanced over the crop processor shown in U.S. Pat. No. 4,550,554 and the references cited therein. This processor and crop transfer mechanism is an advancement over the crop processor shown in U.S. Pat. No. 5,005,342 and the references cited therein.

SUMMARY OF THE INVENTION

A principle object of the invention is to provide an auger cutter that will cut standing or downed crops of hay with a cut and lift action, and condition the crop as it is cut to speed the drying process without loss of nutrient value, and will position the crop in windrows for drying and further handling. Another principle object of the invention is to provide an auger cutter that will cut a standing crop such as corn, sorghum and cereals, compress the crop, and feed the crop after compression into the entrance of a second crop processor such as a forage harvester without loss of crop and at a very rapid rate. Other objects are to provide improved cutting and handling of the crop whether it be hay or corn by utilizing improved cutting mechanisms on an auger cutter and to provide improvement in the feeding mechanisms and discharge mechanisms to feed either the cut crop or a compressed cut crop from the crop processor. This invention also has as another object to ensure that no vestige of the uncut crop remains after cutting. Such remaining crop resulted from using the cutting mechanism disclosed in U.S. Pat. No. 5,005,342. This invention also improves the feeding of the crop to the discharge area.

FEATURES OF THE INVENTION

Principle features of the invention include a cutter assembly having an auger cutter with a central tubular shaft and auger flights extending there around. The auger flights are formed from a flange that is helical around the central shaft and the direction of rotation of the helix may be reversed at a selected point on the tube if required. The cut crop is discharged through an opening in the central area of the processor or may be discharged to either side of the crop processor. In the case of hay the crop is allowed to drop onto the ground in a windrow.

Cutting teeth are attached to the flighting near the peripheral outer edge to cut the standing and downed crop at the base of the plant. This cutting action is accomplished the cutting auger rotating forwardly and upwardly. The teeth of a novel design are attached in a variety of ways depending upon the crop to be cut and the amount of conditioning which is desired to be accomplished with the crop. The teeth project from either side of the flange and extend perpendicularly to the flange of the helix to which they are attached. The teeth are held in proper position during operation by centrifugal force or they may be firmly affixed.

A plurality of conveying augers are positioned to receive the cut and conditioned crop from the cutting auger and to convey the crop to a central discharge area or to either side of processor for discharge. The discharge may be either onto the ground or into a second crop processor depending upon the crop and the ultimate usage of the crop as determined by the desire of the operator. The conveying auger is provided with smooth surface flights formed from a helically wound flange. The rotational speed of the conveying auger is considerably less than the rotational speed of the cutting auger when the cutting auger is being used to cut a crop. The directional rotation of all augers is the same.

There is a central discharge area between the ends of the two conveying augers to provide for the exiting of the crop onto the ground, or into the second crop processor. The crop may also exit either end of said processor if designed for side delivery.

A support frame carries the cutter auger, the conveyor auger, the drive mechanisms for all augers, and a forward top cover that engages the crop at a preset height to properly angle the crop into the cutter. The top cover cooperates with the conveyor augers to move the crop centrally to the discharge opening or to either side of the processor, and a ground engaging roller or shoes provide for height sensing and control and assist in supporting the processor as it travels over the ground.

Another feature of this invention is that by positioning the cutter and feeder augers at an angle to each other and to the direction of travel, there is an improvement in the cutting by removing any division between the cutting augers. Therefore there is no vestige of the crop left uncut. In additions, the angled positioning of the feed augers, as well as the cutter augers, moves the crop to the central discharge area more efficiently. The optional third auger on the top cover as describe in U.S. Pat. No. 5,005,342, would also be angled at the same angle as the cutting augers and the feed augers and rotates opposite to the other augers and thus improve the movement of the crop toward the center.

This third auger means may attach to the front of the front cover and is designed to force the crop, before cutting, toward the center of the crop processor. This auger normally has a more tightly wound helix, rotates at a relatively slow rate as compared with the auger cutter, prevents material from escaping the cutter and ensures that the crop proceeds as rapidly as possible to the center.

Additional objects and features of the invention will become apparent from the following detailed description, drawings, and claims.

DETAILED DESCRIPTION OF A PREFERRED EMBODIMENT OF THE INVENTION

Figure 5:
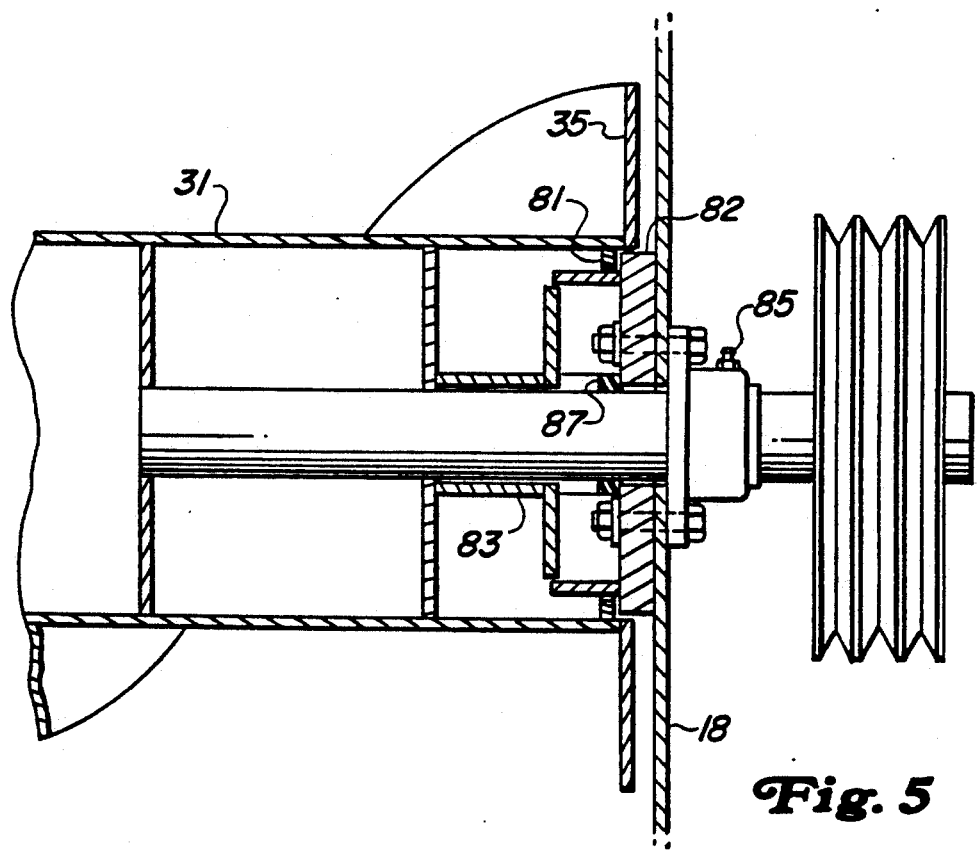
FIG. 5 shows detail of bearings and mountings at the center and end plates.

Referring now to the drawings: the crop processor of the invention is shown generally at 10. The crop processor includes the auger cutters 31 and 32 and other operating elements of the crop processor. The crop processor is normally attached to a prime mover, not shown. The crop processor 10 includes a support frame 12, and includes a rear top rail formed from a rectangular tube, and having end plates 18 and center plate 17. There are normally bearing units fitted into the ends of the plates and bearing units at the center to support the auger cutters, bearings also support the conveyor augers and the third auger, not shown. The fittings for these bearings for the auger cutters are shown in FIG. 5.

Figure 1:
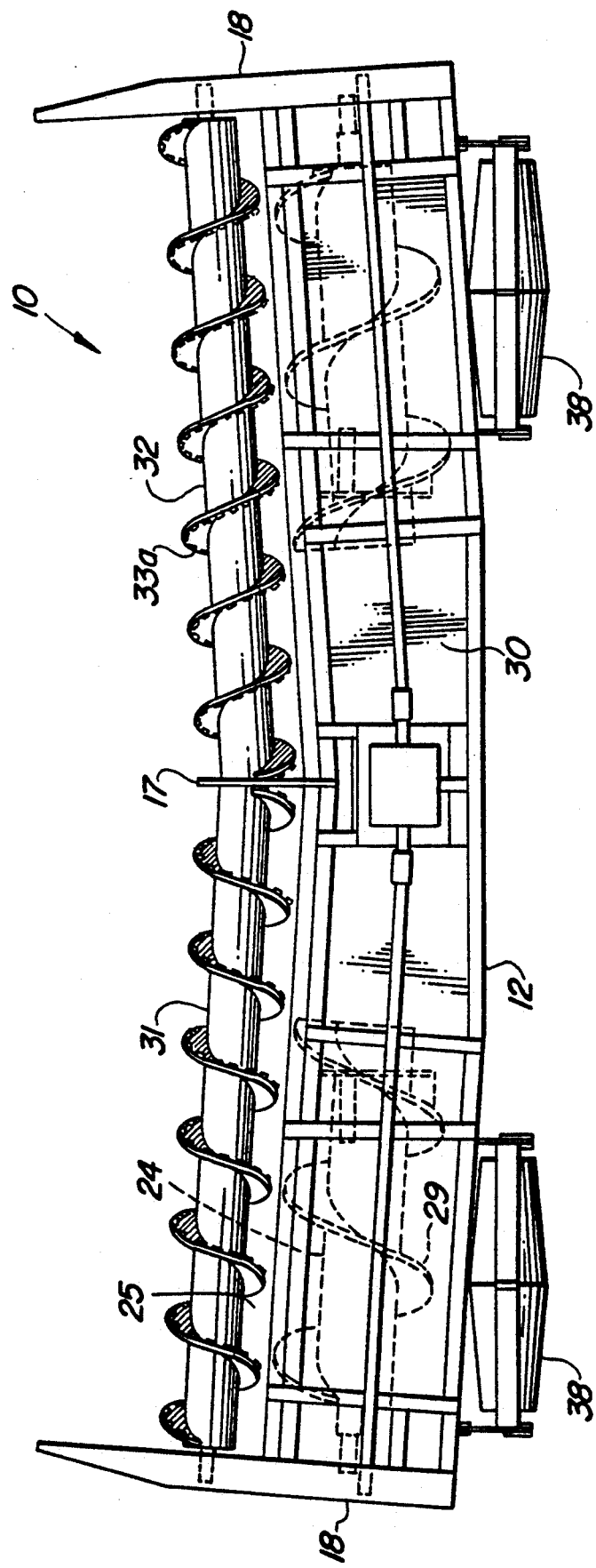
FIG. 1 is a top view of the crop processor, showing the angled relationship between the augers.

The operation of the auger cutters and the conveyor augers is as described in U.S. Pat. No. 5,005,342 in column 3, lines 5-60. The baffle plate operation will be substantially as described in U.S. Pat. No. 5,005,342 column 3 lines 62-68 and column 4, lines 1 and 2. It has been found and, as shown in FIG. 1, that by placing the cutting augers and other augers at an angle to the direction of travel, in the range between 2 and 15 degrees (experience, during testing, has shown that approximately seven degrees works best) that any center-cutting gap at the forward side of augers is closed. The rotation of the teeth on the cutting augers 31 and 32 is such that they approximately overlap the center and complete cutting of the crop is accomplished. By having this angled relationship or taper, the grass or crop that has normally not been cut by prior art divided augers, is now forced to one side or the other by the angle and the center plate and gets cut by the teeth on at least one of the cutting augers. This improved cutting is accomplished because the taper angle allows the teeth 37 to cut the complete crop. These teeth 37, traveling in the same direction and at the same speed, will not interfere with each other. The tapered angle of the augers 27 and 27(a) has also been found to improve the movement of the crop to the discharge area. The third auger 45, normally placed on the door or front cover unit 43 as shown in FIG. 6 of U.S. Pat. No. 5,005,342, will also be angled in the same manner as the other two augers and results in better transfer of tall crop inwardly toward the cutting augers.

This cutting or crop processing unit may also have a pair of ground engaging rollers 38, such as described in U.S. Pat. No. 5,005,342, column 4, lines 3-39.

This improved crop processor, however, has replaced the rollers with a pair of shoes 29 and 30 attached to various support members of the crop processor. In operation, the back shoes 30, which are supported by the frame, will rest upon the ground and are controlled by the height control mechanism, including the hydraulic system of the prime mover and the frame including member 55, to have the cutter auger as close to the ground as desired by the operator.

The tilting angle and thus the height of cut above the ground of the crop processor is controlled by cylinder 57, which is connected at one end to support member 55, and to the frame member 12, at the other end. As the cylinder is extended, the rate of change of the cutting height will be decreased. In the event that there is a rise in the ground, shoe 29 first encounters the change. Shoe 29 lifts the machine to maintain the desired cutting height above the ground. As the machine moves forward, shoe 30 next encounters the change in contour and again assume the support necessary to maintain the cutting height. The front shoe 29, normally extends a substantial portion of the width of the cutter to sense ground contour changes and to support a portion of the weight of the crop processor on the ground. It may be necessary to surface harden this member to take the extra wear from contact with the ground.

This improved crop processor may also require the push/feed augers described in U.S. Pat. No. 5,005,342, column 5 lines 21-64. In addition, air pressure release will be necessary in this improved cutter and that will be substantially as described in U.S. Pat. No. 5,005,342, column 6, lines 25-39. The teeth 37 on this improved crop processor may be substantially as described in U.S. Pat. No. 5,005,342, column 7, lines 33-61. However, an improved tooth such as described in our co-pending application, Ser. No. 07/932,602, may be substituted and will result in improved performance.

Each auger has a shaft that is journaled at the respective end plates and center plate. The improvement in the cutting action and crop movement resulting from the cant or angling of the augers, from the prior art, perpendicular to the movement, common axis mounting, caused unexpected problems with the journals, bearings and seals. These problems were caused by material wrapping on the shaft and dirt entering the bearings, especially at the center plate. This dirt and material compressed into a mass and damaged seals, bearings, mounting bolt and grease fittings. This resulted in failed seals, bearings, mounting bolts, and grease fittings after a few acres of operation. To obtain the cutting and crop transport improvements, means for protecting or maintaining the integrity of the bearings were required. The embodiment of such improved means utilized in this invention are shown in 3 and 4.

Figure 2:
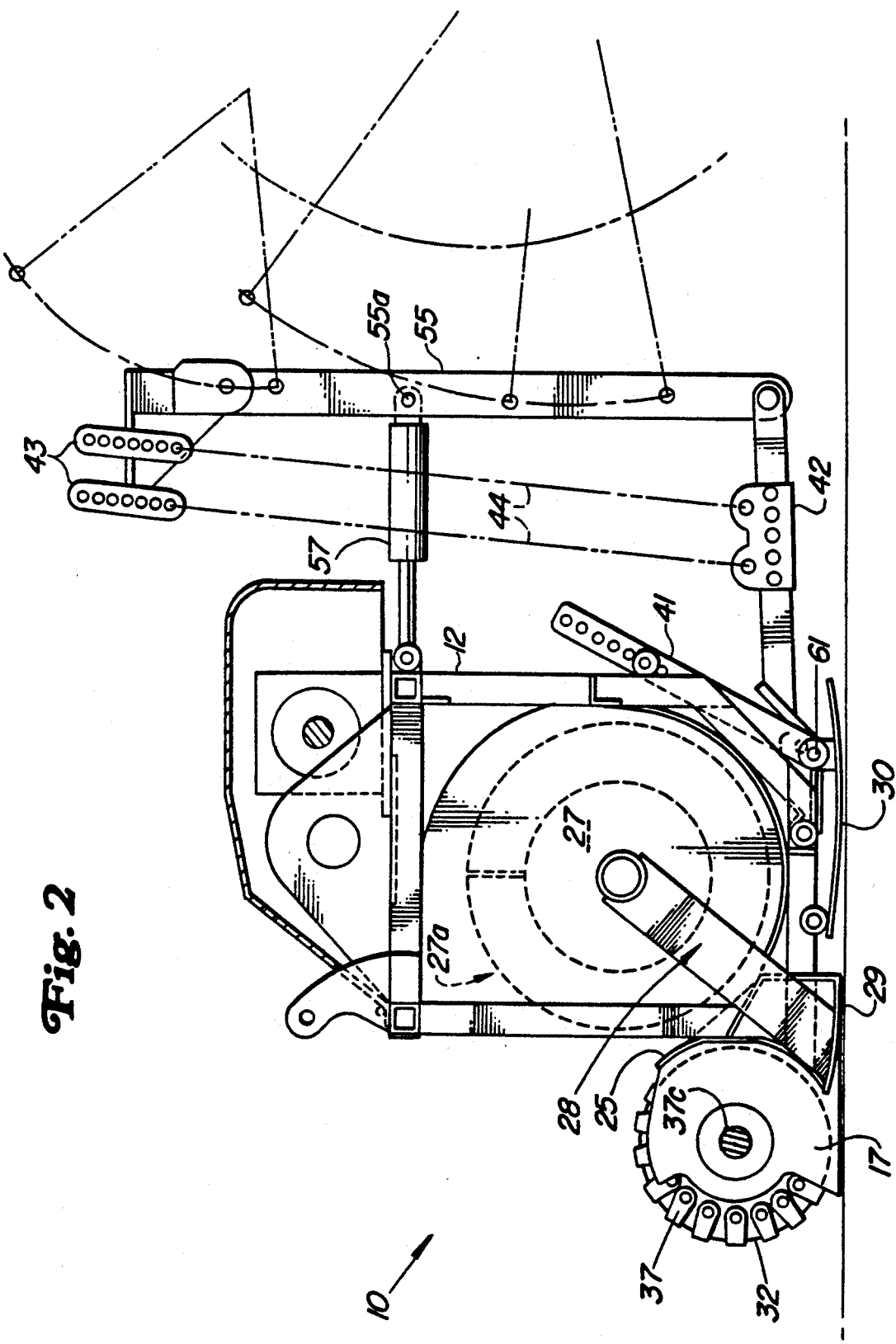
FIG. 2 is a side view of the crop processor of this invention, which may be attached to a prime mover and power unit, not shown.
Figure 3:
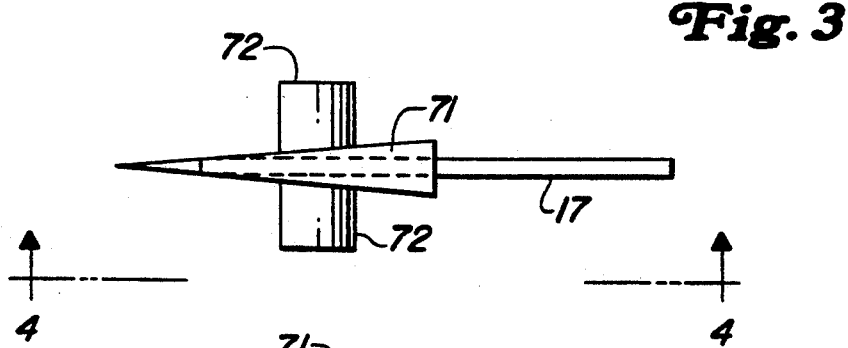
FIGS. 3 and 4 show details of center plate between the augers of this invention.
Figure 4:
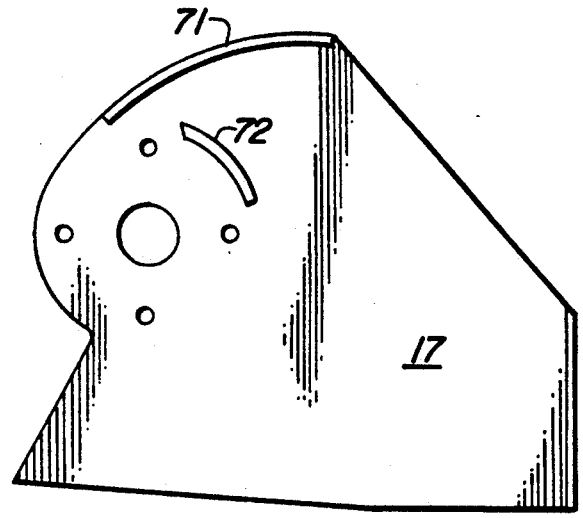

FIGS. 3 & 4 illustrate the improvement in bearing protection for cutting augers at the center plate 17. The shape of the center plate was designed to be an extension of the baffle plate as shown in FIGS. 2, 3 & 4. Stripper plates 71 were then added to the baffle plate to clean the end plates of the auger as it rotated around the center plate 17. Additionally it was found necessary to add means to keep the inside of the auger tube free of debris. A novel means of cleaning the auger tube comprised tube cleaner plates 72, shown in FIG. 3. These plates scrape the tube and keeps it clean and prevents build up and damage.

A further problem of the deterioration of the seals of bearings on the end plates occurred because of the dirt and contamination destroying the seal. This occurred at both bearing areas. The central areas were substantially cured by utilizing bearings including a metal flinger to protect the seal.

In addition, on the outer bearings a novel means was required to protect the seals. This novel system comprises a plurality of plates which isolate the bearing housing from the crop. This is illustrated in FIG. 5 where the rotating plate 81, the stationary ring 82, and the flinger plate 83 are affixed to the end plate 18 and the auger tube 31, using spacers 86 and auger end ring 35, as illustrated. This creates a labyrinth through which very little material, sediment, or dirt can reach the entrance to the cavity 84 which protects the bearing and seal 87. In addition bearing and seal protection is provided when grease is forced into the cavity from the bearing as the grease is furnished under pressure through the grease fitting 85 to the bearing. This substantially prevents any dirt which has escaped the labyrinth and entering the cavity 84 filled with grease. This grease barrier will automatically reduce the ratio of contaminant lubricant to extend bearing life.

As noted, the present disclosure is based on a preferred embodiment of the invention. Features and advantages other than those specifically pointed out herein will occur to those versed in the art, as will many modifications in the preferred embodiment presented, all without departing from the spirit and scope of the invention.

We claim:

1. A crop processor comprising:
   a support frame coupled to a prime mover, said support frame having the side adjacent the prime mover at right angles to the direction of travel of the processor and ends parallel to the direction of travel of the processor;
   a drive system for said processor connected to and powered from said prime mover;
   at least two conveyer augers on a common horizontal plane, each including a helical flange thereon, each conveyor auger supported in cantilever fashion on said support frame at opposite ends thereof, each of said conveyor augers being less than half the width of the processor, the conveyor augers being canted at an angle to the direction of travel of the crop processor;
   conveyor auger housings cooperating with said conveyor augers to move the material;
   at least two cutting augers on a common horizontal plane;
   support means for each of said cutting augers at the ends and at the center of the processor;
   each of said cutting augers having a helical flange there around with the flange from the outside turned in the same direction as the conveyor flange for at least a portion of the length of the conveyor auger and a continuation reversely turned flange for the remaining length of the cutting auger to the center of the processor;
   said cutting augers mounted and canted at substantially the same angle to the direction of travel as said conveyor augers; each of said flanges including a plurality of means for mounting cutting teeth thereon;
   a plurality of cutting teeth;
   a front cover means pivotally attached to said support means;
   a rear cover means;
   a baffle means attached to and extending from said conveyor auger housing enlarging the volume for conveying the cut crop;
   a center discharge area to discharge cut crop to the rear of said processor;
   means for selecting and maintaining the height of the cutting augers above the ground, including a pair of shoes;
   whereby the crop is cut by the cutting augers and fed by the conveying augers to the center area for discharge.

2. A crop processor, in accordance with claim 1, wherein said angle to the direction of travel of said conveyor augers and said cutting augers is between two and fifteen degrees.

3. A crop processor, in accordance with claim 1, wherein the angle of the axis of said conveyor augers and said cutting augers to the direction of travel is approximately seven degrees.

4. A crop processor, in accordance with claim 1, wherein said means for selecting and maintaining the height of the cutting augers above the ground, includes means for preselecting the cutting height, sensing means for sensing changes in the contour of the ground, and maintaining said cutting height above the ground in response to said changes in contour.

5. A crop processor, in accordance with claim 4, wherein said support means and said sensing means includes a plurality of shoes in contact with the ground.

6. A crop processor, in accordance with claim 5, wherein said shoes are placed in alignment on each side of the processor from the front of the processor to the rear of the processor.

7. A crop processor, in accordance with claim 6, wherein said forward shoe is in close proximity to the cutting augers whereby positive changes in the ground contour are rapidly responded to by said first shoe.

8. A crop processor, in accordance with claim 7, wherein said second shoe is supported on the mainframe of said crop processor and the pivot point of said crop processor is normally on said second shoe and means including said first shoe for reacting to the distance the auger cutter is above the ground to decrease the rate of change of the cutting height of said cutter head as distance above the ground is reduced.

9. The crop processor in accordance with claim 1, wherein said support means for said cutting and said conveyor augers includes means for protecting the bearings in said support member from contamination.

10. The crop processor in accordance with claim 9, wherein said means for protecting the bearings includes mechanical flinger means and structural means to isolate said bearings.

* * * * *